(12) United States Patent
Acuna-Rohter et al.

(10) Patent No.: US 10,529,020 B2
(45) Date of Patent: Jan. 7, 2020

(54) RULE BASED VECTOR SPACE MODEL FOR CREATING IMPLIED TRADE TEMPLATES

(75) Inventors: Jose Antonio Acuna-Rohter, Chicago, IL (US); Pearce Peck-Walden, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 771 days.

(21) Appl. No.: 12/559,215

(22) Filed: Sep. 14, 2009

(65) Prior Publication Data

US 2011/0066567 A1 Mar. 17, 2011

(51) Int. Cl.
*G06Q 40/00* (2012.01)
*G06Q 40/04* (2012.01)

(52) U.S. Cl.
CPC ............ *G06Q 40/04* (2013.01); *G06Q 40/00* (2013.01)

(58) Field of Classification Search
CPC ............................... G06Q 40/00; G06Q 20/00
USPC .................................................. 705/37; 10/37
See application file for complete search history.

(56) References Cited

U.S. PATENT DOCUMENTS

| | | |
|---|---|---|
| 5,631,971 A | 5/1997 | Sparrow |
| 6,247,000 B1 * | 6/2001 | Hawkins ................. G06Q 40/04 705/37 |
| 7,496,533 B1 | 2/2009 | Keith |
| 7,548,882 B1 | 6/2009 | Pazner ............................ 705/37 |
| 2002/0091624 A1 * | 7/2002 | Glodjo ................... G06Q 20/10 705/37 |
| 2003/0069830 A1 | 4/2003 | Morano et al. |
| 2003/0236738 A1 * | 12/2003 | Lange .................... G06Q 40/06 705/37 |
| 2007/0294157 A1 | 12/2007 | Singla et al. |
| 2008/0288391 A1 | 11/2008 | Downs et al. |
| 2011/0055069 A1 * | 3/2011 | Pazner ............................ 705/37 |
| 2011/0320338 A1 * | 12/2011 | Farrell et al. ................... 705/37 |

OTHER PUBLICATIONS

Michael B. Spring, Electronic Payment Systems, Sep. 28, 2001, University of Pittsburgh, web, 2-14 (Year: 2001).*
Chicago Mercantile Exchange, "Implied Pricing for Eurodollar Futures on GLOBEX," Dec. 2003, pp. 5-11, printed from the Internet Oct. 8, 2008, http://iraepstein,linngroup.com/uploads/exchange-pdfs/cme40.pdf.
International Search Report dated Oct. 20, 2010 received in related PCT Application No. PCT/US2010/47481.

(Continued)

*Primary Examiner* — I Jung Liu
(74) *Attorney, Agent, or Firm* — Lempia Summerfield Katz LLC

(57) ABSTRACT

A match engine is utilized by either a market participant or an electronic trading system. The match engine receives orders, stores them internally, calculates tradable combinations and displays or otherwise publishes the tradable combinations or the order(s) needed to complete tradable combinations. The match engine operates under a set of rules that may be customized to provide only the tradable combinations that are likely to be executed and contribute to total trading volume. At least some tradeable combinations that are not likely to be traded are not calculated, which frees up the computing capacity of the electronic trading system.

22 Claims, 6 Drawing Sheets

(56) References Cited

OTHER PUBLICATIONS

Australian Patent Office, Patent Examination Report 1, dated Feb. 26, 2013, AU.
International Preliminary Report on Patentability dated Mar. 20, 2012 received in related PCT Application No. PCT/US2010/047481.
Patent Examination Report No. 2, from related Australian Application No. 2010292442, dated Oct. 17, 2013, AU.

* cited by examiner

200

| $L_1^+=(1,0,0)$ | $L_1^+\ L_2^-=(1,-1,0)$ |
| $L_1^-=(-1,0,0)$ | $L_2^+\ L_1^-=(-1,1,0)$ |
| $L_2^+=(0,1,0)$ | $L_2^+\ L_3^-=(0,1,-1)$ |
| $L_2^-=(0,-1,0)$ | $L_2^-\ L_3^+=(0,-1,1)$ |
| $L_3^+=(0,0,1)$ | $L_3^+\ L_1^-=(-1,0,1)$ |
| $L_3^-=(0,0,-1)$ | $L_3^-\ L_1^+=(1,0,-1)$ |

FIG. 3

RULE BASED VECTOR SPACE MODEL FOR CREATING IMPLIED TRADE TEMPLATES

TECHNICAL FIELD

The following disclosure relates to software, systems and methods for electronic trading in a commodities exchange, derivatives exchange or similar business involving tradable items where orders from buyers are matched with orders from sellers.

BACKGROUND

Electronic trading systems allow entry of a bid or offer for a particular tradable item. Simple bids and offers for a particular tradable item are called outright orders. A spread order is the simultaneous purchase and sale of two or more tradable items, such as futures contracts for different months, different commodities, or different grades of the same commodity. Each bid and offer component of a spread is termed a bid leg and an offer leg respectively. Real orders are orders that are entered into the system by traders. The traders enter the appropriate information into the trading system and release the order into the system as an open order. Real orders may be entered for any tradable item in the system including, but not limited to, futures, options, inter-commodity spreads, intra-commodity spreads, futures strips, calendar spreads, butterfly spreads, condor spreads, crack spreads, straddles, and strangles.

Implied orders, unlike real orders, are generated by the system on the behalf of traders who have entered real orders. For example, an implied spread may be derived from two real outright orders. The system creates the "derived" or "implied" order and displays the market that results from the creation of the implied order as a market that may be traded against. If a trader trades against this implied market, then the real orders that combined to create the implied order and the resulting market are executed as matched trades.

The complexity of the market arises from, among other things, the large number of potential order combinations. For example, a single commodity product available in 72 different delivery months will have 72 possible outright contracts, each of which may have a resting buy order or a resting sell order. There are 2556=(72*71)/2 potential spread contracts, noting that the buy/sell combination and sell/buy combination of any two outrights both correspond to the same spread contract. For a simple implied where two orders combine to form a third, there are 5256=2*72+2*2556 choices of the order to imply and 71=72−1 ways to choose a combination of two orders implying any given third order, leading to 373,156 combinations overall. As the number of contracts involved in the implication gets larger, the number of possible combinations grows exponentially. The problem is further aggravated when the implied orders can include orders in combination contracts with multiple legs.

For these reasons, trading systems that derive implied orders are often limited by computing capacity and speed. Conventional trading systems do not have an efficient method of determining all possible or best possible implied markets, especially when the order combinations involve more than a few orders.

One example of a trading system is described in U.S. Pat. No. 7,548,882 to Pazner. The trading system solves for all possible market combination using a brute force method. Equations for markets are generated and solved through substitution in an iterative process that determines all possible combinations in a particular sequence. Using this iterative process, all possible implied orders are computed without attention to which implied orders are most likely to actually result in trades. The inability to calculate and publish implied orders in a timely manner that will likely result in trades has limited the use of this type of trading system.

What is desirable is a system for calculating implied orders using a focused algorithm that will calculate the implied orders more likely to result in trades first without spending time and computing capacity on all theoretical combinations.

BRIEF DESCRIPTION OF THE DRAWINGS

FIG. 3 illustrates an exemplary vector space.

DETAILED DESCRIPTION

The order matching function in a trading system is typically performed by a specialized component referred to as the match engine, of which there may be multiple instances. Each match engine is a specialized order matching component that receives orders, stores them internally, calculates tradable combinations and advertises the availability of real and implied orders in the form of market data. The match engine may calculate tradable combinations at the beginning of a time interval. For example, the time interval may correspond to a trading day or be indicated by the boot sequence of the match engine. Alternatively, the match engine may calculate the tradable combinations in real time. For example, the tradable combinations that involve each received order may be calculated when the order is received.

When the traders using the system respond to the market data by sending additional orders, these are received by the match engine, which then attempts to match them with previously received orders or combinations thereof. The match engine executes possible trades and communicates the results.

Only a subset of the total possible trades are calculated by the match engine. The match engine operates under a set of rules (constraints) that may be customized to provide only the tradable combinations that are likely to be executed and contribute to the trading volume of the exchange. Tradeable combinations that are not likely to be traded are not calculated, which frees up the computing capacity of the electronic trading system.

One of the advantages of quickly identifying tradable combinations is that the exchange can execute trades that would not have previously occurred. An increase in trading volume is an increase in revenue for the exchange. Additionally, a market participant (independent of the exchange) using a system that can identify unpublished tradable combinations may be able to profit from arbitrage opportunities. Arbitrage opportunities occur when a trader is able to place a series of orders to take advantage of a price differentials in two or more markets. Assuming the arbitrage opportunity can be accurately determined and the trades timely executed, an immediate profit is realized.

Figure 1:
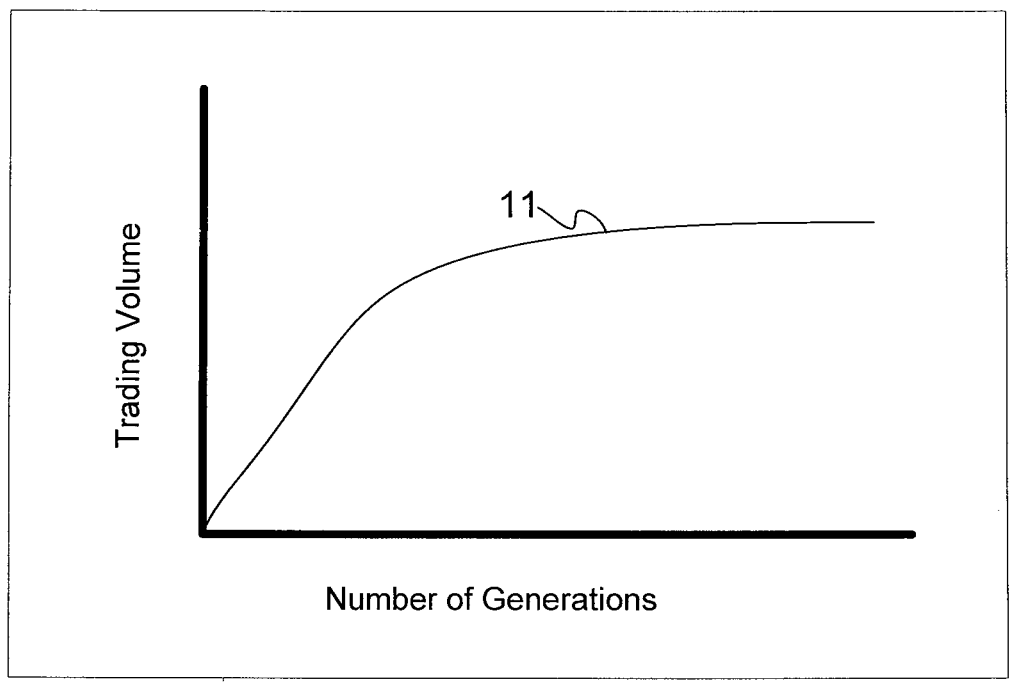
FIG. 1 is a graph of trading volume.

As discussed above, iterative methods of calculating all possible implied orders may not function under the limits of computing capacity and time found in the exchange. As the tradable combination becomes larger, the chance that an executed trade will actually result from indentifying the corresponding implied order decreases. FIG. 1 demonstrates this principle by illustrating that the slope of plot 11 decreases as the number of generations increases. The "number of generations" refers the number of outright orders or strategies that may be combined with the original order to reach a tradable combination. In other words, the number of generations in a tradable combination is the number of implied orders that are based off of other implied orders.

Figure 2:
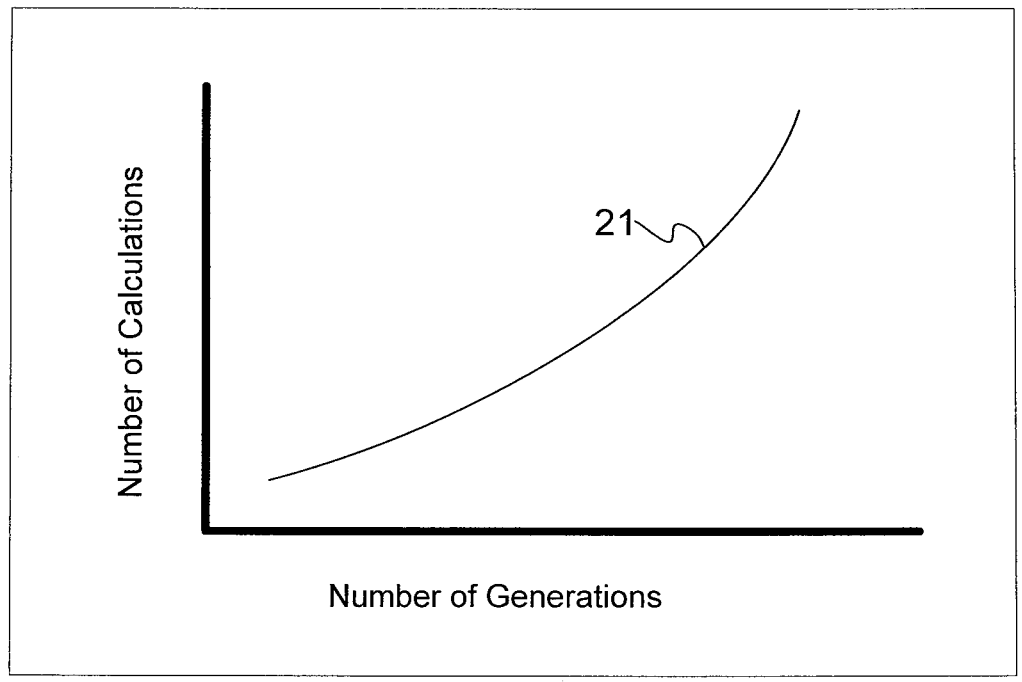
FIG. 2 is a graph of implied order calculations.

As the tradeable combination becomes larger, the number of calculations involved in computing the implied order increases exponentially. For example, FIG. 2 demonstrates that the slope of plot 11 increases as the number of generations increases. As demonstrated by FIGS. 1 and 2, an Exchange experiences a diminishing marginal return on the computing power and time needed to compute all tradable combinations.

One of the challenges in calculating tradable combinations is identifying combinations that include complicated strategies. A combination contract or "strategy" is defined by two or more outright contracts which are referred to as legs. Regulated and unregulated exchanges and other electronic trading services make use of electronic trading systems. For example, the following embodiments are applicable to any trading or futures market in the United States or elsewhere in the world, for example, the Chicago Board of Trade (CBOT), the Chicago Mercantile Exchange (CME), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

FIG. 3 an exemplary vector space 200. In commodities trading, an outright contract is defined by a product and a delivery period. A spread contract is defined as the simultaneous (or near simultaneous) purchase and sale of two outright contracts. Calendar spread contracts are spread contract between futures contracts for different months and the same commodity. Intercommodity spreads are spread contracts between futures contracts for different commodities but the same month. The combination of a calendar spread and an intercommodity spread, a spread between futures contracts for different commodities and different months, may also be traded. The purchase component of the spread may be referred to as the bid leg, and the sale component of the spread may be referred to as the offer leg. The vector spread of FIG. 3 includes three outright contracts and the possible spreads involving the three outright contracts.

Various conventions or nomenclature could be used to represent the possible financial instruments. FIG. 3 illustrates a system that represents outrights $L_1$, $L_2$, and $L_3$ and the spreads involving outrights $L_1$, $L_2$, and $L_3$ using a vector notation. Each column in the vector represents one of the possible outrights. For example, the vector may be defined as ({June crude oil}, {September crude oil}, {December crude oil}), in which case the spreads will be calendar spreads. An order represented as (0, 0, 1) is a buy order for December crude oil. A spread represented as (0, 1, −1) is a calendar spread to buy September crude oil and sell December crude oil.

The total number of outrights (or columns) in the vector defines the total number of instruments possible. Of course, some of the instruments may not be available on the Exchange. The example of FIG. 3 shows 12 possible instruments: a buy order for each of the three financial instruments, a sell order for each of the three financial instruments, and the six calendar spreads involving the three financial instruments.

The quantity "1" represents buying one trading unit, which could correspond to any quantity as defined by the exchange. While not shown, buying two trading units may be represented as "2" and so on. Negative signs indicate selling trading units.

The example shown in FIG. 3 lists complementary orders. For example, both (1,0,0) and (−1,0,0) are shown. In an alternative construction, pairs of complementary orders need not be included in the vector space. That is, only one of (1,0,0) and (−1,0,0) would be included. If the construction of a tradable combination, as discussed below, needed a complement of a vector, the system would simply multiply each column in the vector by −1. This can occur because generally any order can be either a buy or a sell. Using this construction, the vector space of FIG. 3, could be shown using only six vectors: for example, (1,0,0), (0,1,0), (0,0,1), (1,−1,0), (0,1,−1), and (1,0,−1).

A butterfly spread contract may be represented using the vector notion as (1, −2, 1). A butterfly spread contract consists of three legs referred to as the wing, the body and the (second) wing. Typically, the butterfly spread contract is defined with the wing, the body and the second wing in three successive delivery periods. The double position in the middle is called the body, while the two other positions are called the wings. To take a long position in the butterfly spread contract, the trader or market participant buys the wings and sells the body. In this example, the buy orders make up the wings and the sell orders make up the body.

While not shown, futures strips could also be represented using the vector notation. A futures strip is the purchase of a commodity in a series of periods, which may be sequential. For example, using the vector ({June crude oil}, {September crude oil}, {December crude oil}) above, (1, 1, 1) would indicate strip order to buy crude oil futures in June, September, and December. It should be noted that the example of FIG. 3 could also optionally include strip orders such as (1,1,0), (0,1,1), (1,0,1), or (1,1,1).

The electronic trading system disclosed herein selectively matches possible orders in tradable combination that are likely to actually increase the total volume of trading. For example, the match engine in the electronic system is configured to operate a predetermined set of rules that have been shown to increase the likelihood of reaching tradable combinations in less time than brute force or iterative processes.

Figure 4:
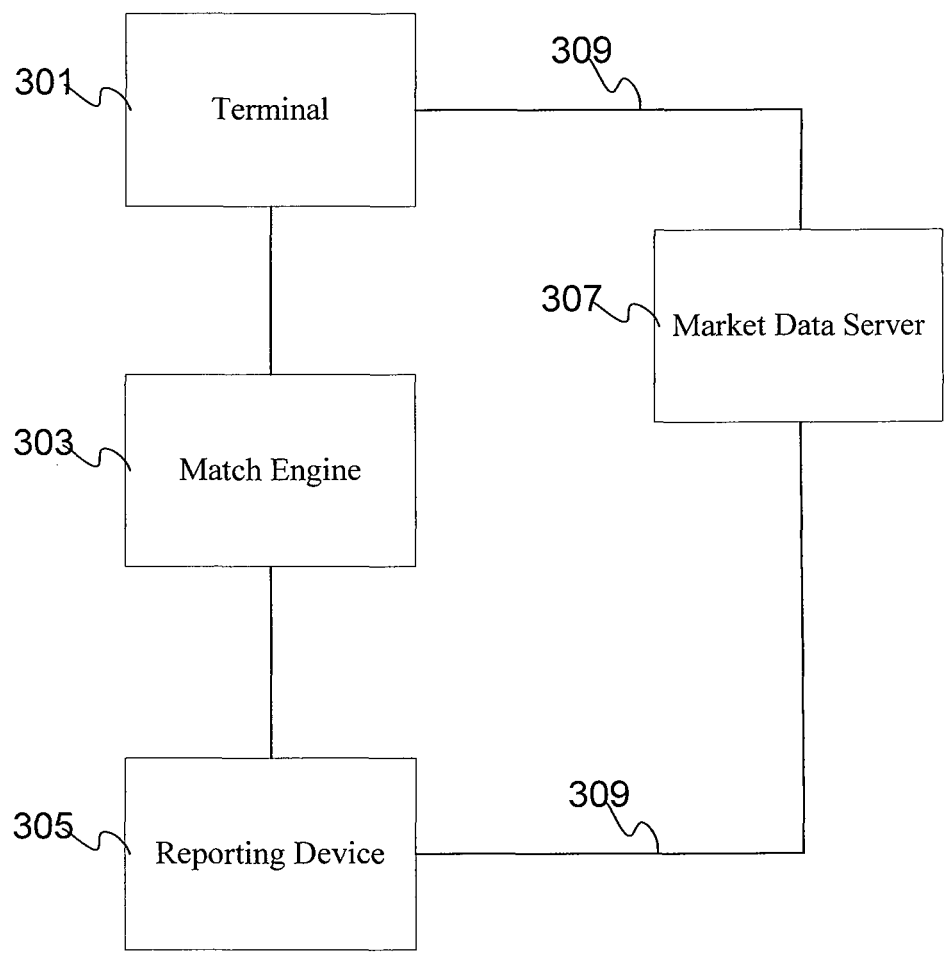
FIG. 4 illustrates an electronic trading system.

FIG. 4 illustrates an electronic trading system 300. The electronic trading system 300 includes one or more terminals 301, a match engine 303, a reporting device 305, and a market data server 307. The match engine 303 is coupled with the reporting device 305 and one or more terminals 301. The market data server 307 may be coupled with the match engine 303, the reporting device 305, or both. As used herein, the term "coupled with" includes directly connected or indirectly connected through one or more intermediary components. The optional intermediary components may include networks, hardware and/or software.

One or more terminals 301 may be used by traders or market participants to place orders and/or receive market data. Terminals 301 may be implemented using personal computers, servers, mobile phones, personal digital assistance, or wireless devices. Terminals 301 include a central processor that controls the overall operation of the computer, a user interface that allows the trader or market participant to enter and/or receive information, and a communication device such as a network card or a modem that allows communication with the electronic trading system 300.

Terminals 301 may be in communication with the electronic trading system 300 by way of a local area network (LAN) 309 or wirelessly by way of a transceiver. LAN 309 may be implemented using a variety of protocols and specifications, such as Ethernet. The physical connection of LAN 309 may be twisted pair wires, coaxial cable, or fiber optics. LAN 309 may also be in communication with the Internet, which would allow terminals 301 to be in any location remote from the rest of the electronic trading system 300.

Match engine 303 is a specialized order matching component that receives orders, stores them internally, calculates tradable combinations, and advertises the availability of real and implied orders in the form of market data. Traders or market participants may respond to the market system by placing additional orders, which are received by the match engine 303. The match engine 303 attempts to match them with previously received orders or combinations of orders. The match engine 303 executes any completed tradable combination and communicates the results.

Market data server 307 may be a server or other computer coupled with LAN 309. Reporting device 305 may be a communication device for encoding and/or decoding data for communication on LAN 309. Reporting device 305 may include a display configured to communicate tradable combinations and/or implied orders to market participants or traders. Additionally, reporting device 305 may be in communication with the Internet to communicate tradable combination and/or implied orders to market participants or traders via the Internet.

Figure 5:
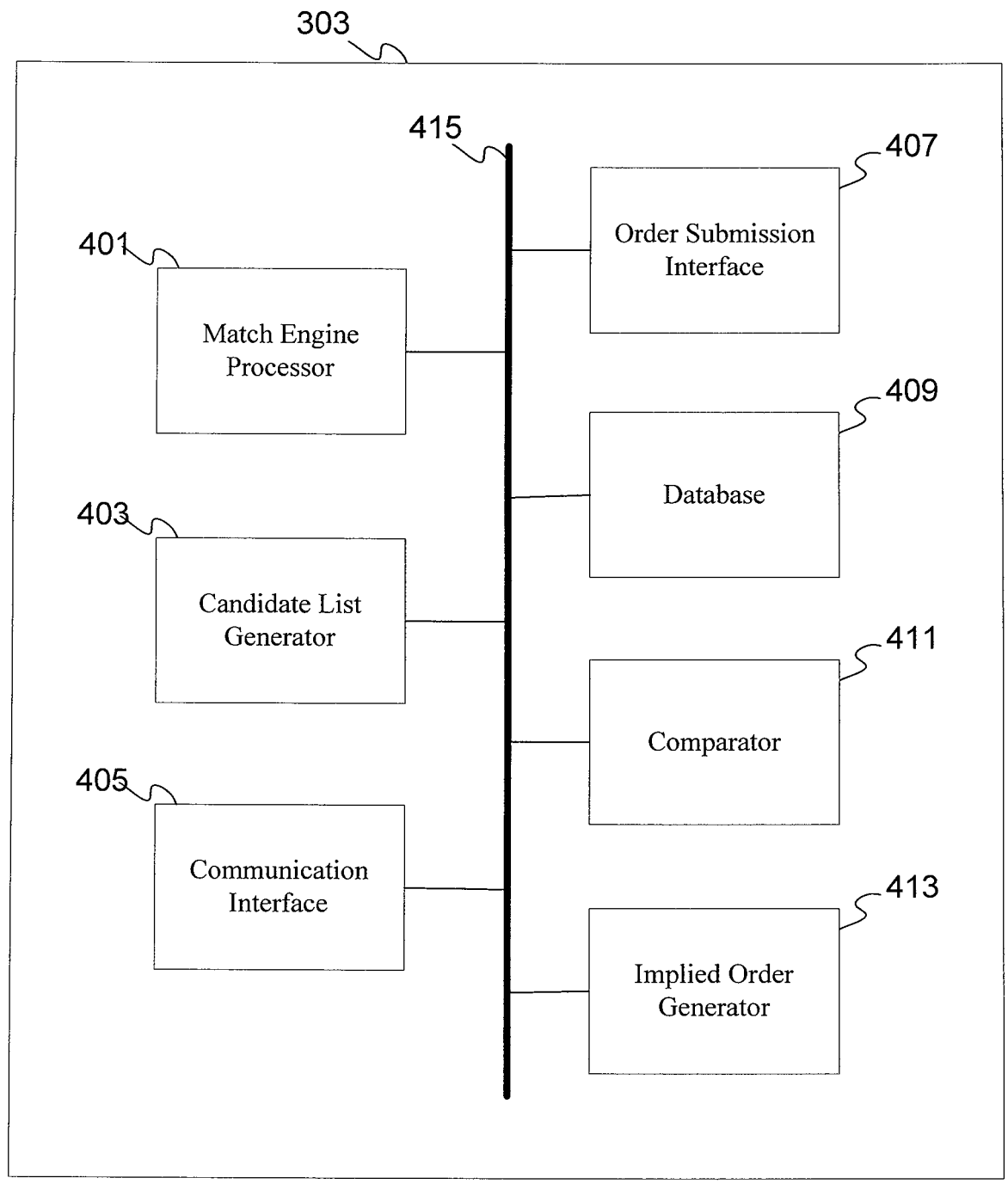
FIG. 5 illustrates a match engine of the electronic trading system.

FIG. 5 illustrates a detailed view of match engine 303 of FIG. 4. Match engine 303 include a match engine processor 401, a candidate list generator 403, a communications interface 405, an order submission interface 407, a database 409, a comparator 411, an implied order generator 413, and a communication bus 415.

The match engine processor 401 represents three or more financial products using a plurality of vectors having a number of columns, wherein the number of columns is equal to the number of unique legs (outrights) making up the financial products. One example of such a plurality of vectors is the vector space 200 shown in FIG. 3. The financial products may be any financial instruments including, for example, futures, options, inter-commodity spreads, intra-commodity spreads, futures strips, calendar spreads, butterfly spreads, condor spreads, crack spreads, straddles, and strangles.

The order submission interface 407 is coupled with one or more terminals 301 and configured to receive orders from traders or market participants. The order submission interface 407 may be a communication device such as a network card or a modem coupled with LAN 309. Alternatively, order submission interface 407 may be implemented with software or firmware capable of receiving and decoding order data from the one or more terminals 301 by way of communication bus 415.

The candidate list generator 403 represents the first order as a vector of the plurality of vectors and identifies a list of candidate vectors from the plurality of vectors. The list of candidate vectors is generated according to a set of one or more rules. The rules may be stored in database 409. One exemplary rule is that each candidate vector has at least one nonzero column in common with the first vector. Another exemplary rule is that only one butterfly spread contract may be used in each tradable combination. In other words, all remaining butterfly spread contracts will be removed from the candidate list after one butterfly is selected.

Alternatively, a rule could be selected that no more than a predetermined maximum number of strategies be used in any tradable combination. The predetermined maximum number of strategies may be any number and the strategies limited could be one or more of inter-commodity spreads, intra-commodity spreads, calendar spreads, butterfly spreads, double butterfly spreads, condor spreads, crack spreads, straddles, and strangles. Other rules may be implemented that are implemented by other components of match engine 303.

After the candidate list has been generated and/or limited according to the predetermined rules, the comparator 411 selects a vector from the list of candidate vectors. The comparator 411 may select any vector from the list of candidate vectors.

In one embodiment, the comparator 411 may select a vector that has as many or more nonzero columns as each vector in the list of candidate vectors (the selected vector may have the most nonzero columns of the candidate vectors or the same number of nonzero columns as other vectors in the candidate list). When more than one vector has the most nonzero columns, a tiebreaker may be used. A tiebreaker may be that the vector with the earliest expiry for the bid leg is selected. The tiebreaker may be that the vector with the latest expiry for the offer leg is selected. The tiebreaker may be simply to select one of the vectors at random. The terms of the tiebreaker may be defined as a rule stored in database 409.

Other rules may be stored in database that control the operation of comparator 411. As discussed above, a rule may prevent comparator 411 from selecting a particular strategy when a strategy of the same type has already been selected. For example, if a condor spread was used in the first iteration, another condor spread cannot be selected in the second iteration. Likewise, a rule could prohibit futures strips from being selected after a calendar spread with a common nonzero column has already been selected because it will naturally lead to a more complicated combination. Another rule may be that no vector in the candidate list may be selected that can form a tradable combination with a previously selected vector. This is because the two vectors that can form a tradable combination should not be used in the search for additional tradable combinations. The two vectors that form a tradable combination would simply be matched without the need for additional calculations.

The rules may be entered into the match engine 303 by a user. For example, the user may communicate or select rules by way of LAN 309 and/or the Internet. Alternatively, the communications interface 405 may include a keyboard or mouse which allows a user to communicate or select rules. Additionally, the communication interface 405 may include a display.

The comparator 411 adds the vector corresponding to the received order to the selected vector to define an intermediate vector and the candidate list generator 403 removes the selected vector from the list of candidate vectors. The intermediate vector is the sum of two or more vectors which does not yield a vector of all zeroes.

The implied order generator 413 is coupled with the reporting device 305. If the intermediate vector includes all zeroes (has no nonzero columns) then a tradable combination has been completed. The implied order generator 413 generates an implied order corresponding to the selected vector such that if a trader or market participant submits an order than will trade with the implied order, the tradable cycle will be completed. The implied order calculated at this stage may be termed a first generation implied order.

If the intermediate vector does not include all zeroes, the process repeats using the updated candidate list. The repeating nature of the process may be governed by a rule. For example, the process may be limited to repeat only once, resulting in no more than second generation implied orders. Alternatively, the process may be limited to repeat any maximum number of times, which may be set by the Exchange.

In other words, the components of the match engine 303 are configured to repeat the above process. The comparator 411 selects another vector (third vector) from the list of candidate vectors and adds the third vector to the intermediate vector to define a second intermediate vector. The third vector may be selected from any of the remaining candidates. In one embodiment, the third vector may be the vector remaining that has as many or more nonzero columns in common with the intermediate vector as all remaining vectors in the list of candidate vectors. The implied order generator 413 is configured to output a second implied order corresponding to the third vector, if the second intermediate vector has no nonzero columns. If the second intermediate vector has one or more nonzero column, the process will repeat again, unless a rule prohibits it. For example, a rule that prohibited more that second generation implied orders would prohibit another repetition.

Figure 6:
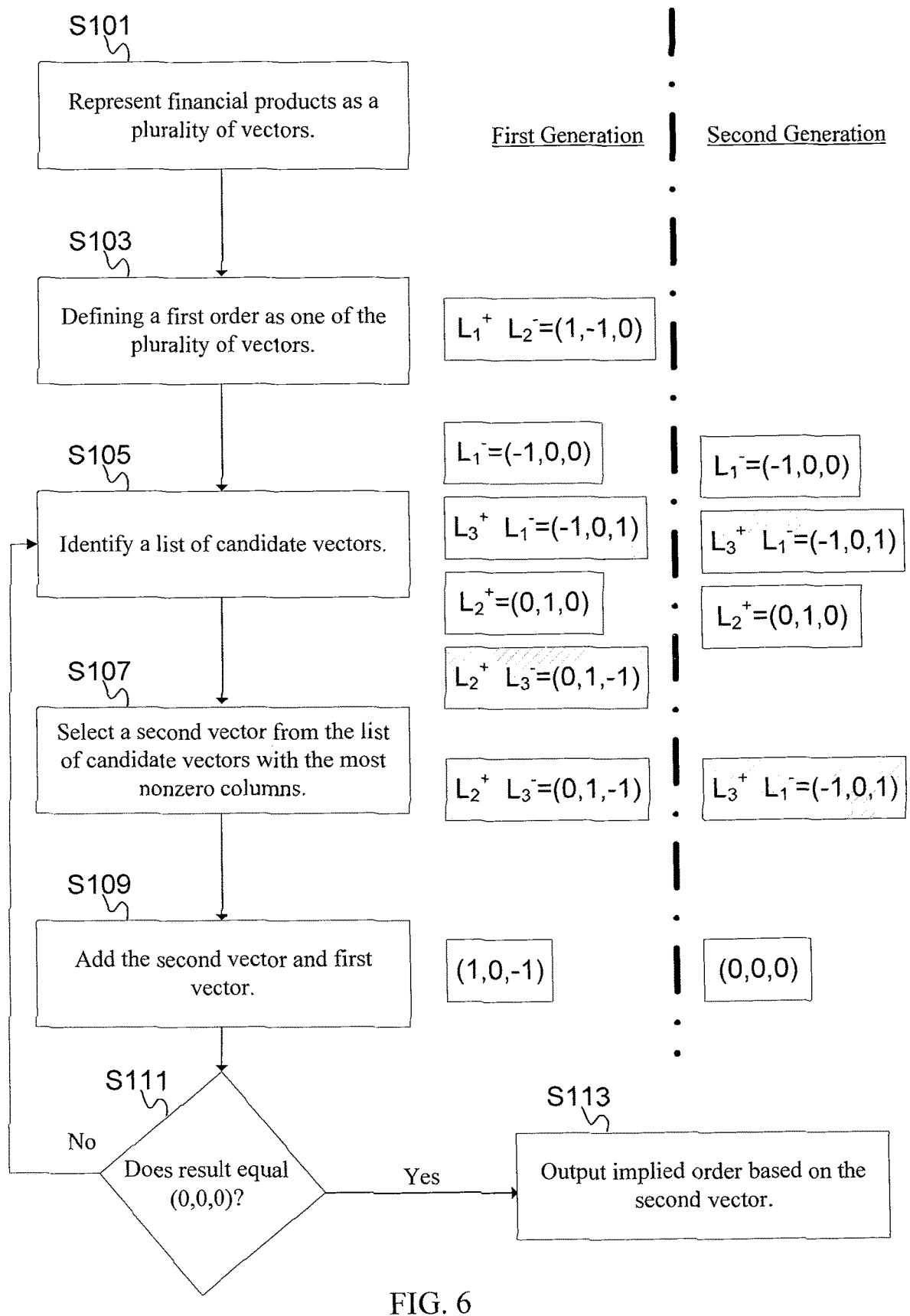
FIG. 6 illustrates an exemplary algorithm for providing implied orders in an electronic trading system.

FIG. 6 illustrates an exemplary algorithm for providing implied orders in an electronic trading system. FIG. 6 also illustrates the exemplary algorithm as performed on the vector space 200 shown by FIG. 3.

At block S101, the match engine 303 represents three or more financial products using a plurality of vectors having a number of columns, wherein the number of columns is equal to the number of unique legs making up the financial products. At block S103, the candidate list generator 403 defines a first order (as a starting point) as one of the plurality of vectors. For example, using the vector space 200 of FIG. 3, $L_1^+ L_2^-$ or (1, −1, 0).

At block S105, the candidate list generator 403 then identifies a list of candidate vectors from the plurality of vectors, each candidate vector having at least one nonzero column in common with the first vector. Continuing with the vector space 200 of FIG. 3, the list of candidate vectors includes (−1, 0, 0), (−1, 0, 1), (0, 1, 0) and (0, 1, −1).

At block S107, comparator 411 selects a second vector from the list of candidate vectors that has one or more nonzero columns as each vector in the list of candidate vectors. Depending on the predetermined rules followed by match engine 303, either (−1, 0, 1) or (0, 1, −1) may be chosen. As shown, (0, 1, −1) is selected.

At block S109, comparator 411 adds the first vector to the second vector to define a first intermediate vector. In the example shown, the intermediate vector is (1, 0, −1). At block S111, the match engine 303 determines whether the intermediate vector has all nonzero values. If the result of block S111 is no, the process returns to S105 and updates the list of candidate vectors. If the result of block S111 is yes, an implied order corresponding to the second vector is output to the electronic trading system 300 at block S113.

In the example shown, the result of block S111 is no, and accordingly the process returns to S105 and a possible second generation implied will be calculated. At block S105, the list of candidate vectors is updated to remove previously used intermediate vector (0, 1, −1). At block S107, comparator 411 selects a third vector from the list of candidate vectors. This time, vector, (−1, 0, 1) is selected. At block S109, comparator 411 adds the third vector to the previously used intermediate vector to arrive at second intermediate vector, (0, 0, 0). At block S111, the match engine 303 determines that the new intermediate vector has all nonzero columns, and an implied order corresponding to the second vector and third vector is output to the electronic trading system 300 at block S113.

Figure 7:
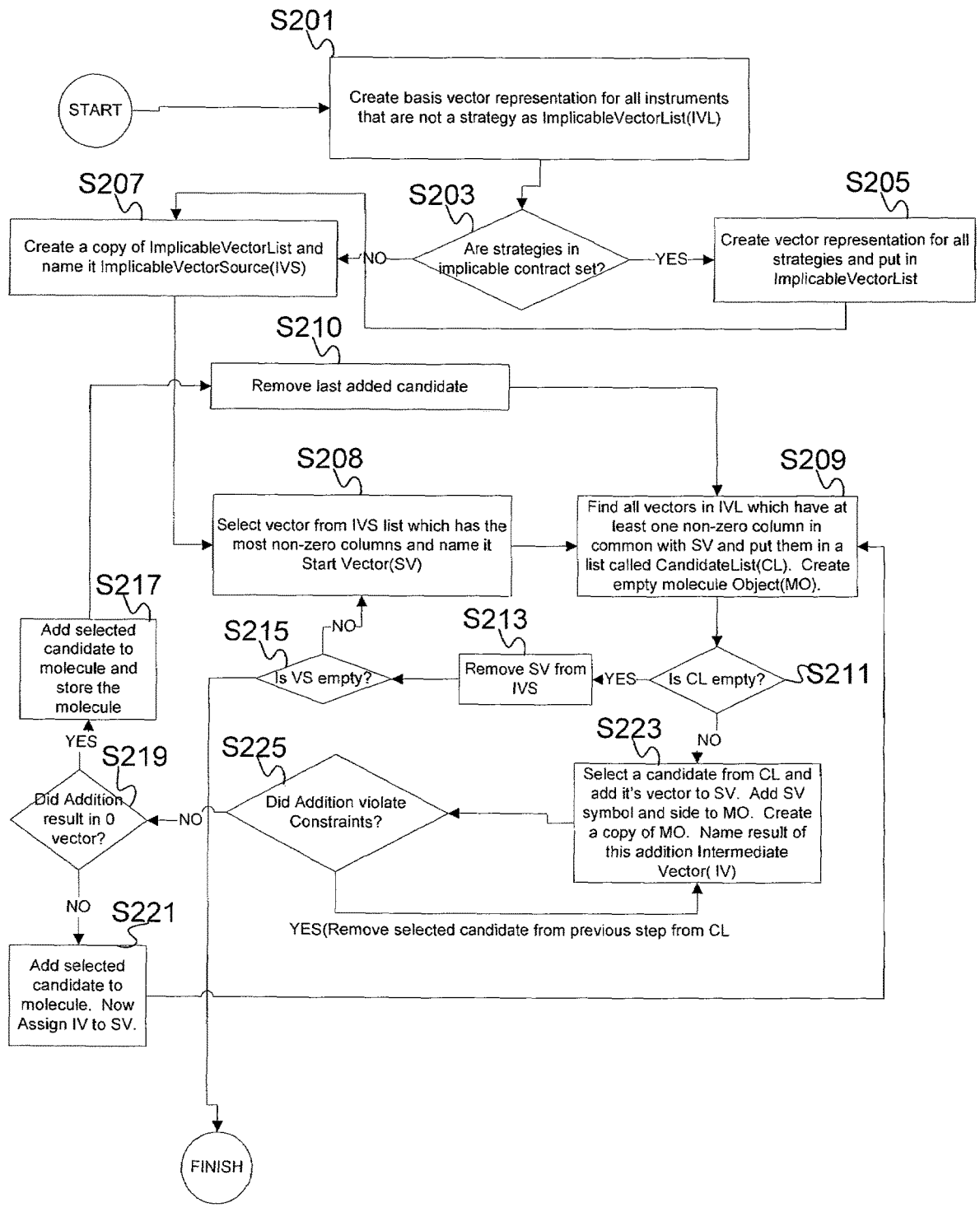
FIG. 7 illustrates another exemplary algorithm for providing implied orders in an electronic trading system.

FIG. 7 illustrates another exemplary algorithm for providing implied orders in an electronic trading system. At block S201, match engine 303 creates a basis vector representation for all instruments that are not a strategy as ImplicableVectorList (IVL). At block S203, the match engine 303 determines whether there are strategies in the implicable contract set. If there are, the match engine 303 creates, at S205, a vector representation for all strategies and includes them in IVL. At block S207, IVL is copied to ImplicableVectorSource (IVS).

At block S208, the match engine 303 selects a start vector (SV) from the IVS list which has the most nonzero columns. At block S209, the candidate list (CL) is generated by finding all vectors in IVL which have at least one nonzero column in common with SV. However, if CL is empty at S211, the starting vector is removed from IVS at S213 and if the IVS is empty, the process finished.

Until CL is empty, the comparator 411 will select a candidate from CL and add it to SV to create an intermediate vector (IV). The match engine 303 will then check the set of rules stored in database 409 to determine, at block S225, whether the addition violates any constraints. If so, the candidate vector will be removed from the candidate list. If not, the comparator 411 will determine whether IV is equal to 0 (includes no nonzero columns). If IV includes nonzero columns, the match engine 303 will return to block S209 and repeat. If IV does not include nonzero columns.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method of optimizing the computation of implied orders to an electronic trading system, the method comprising:
   representing, by a processor, three or more financial products using a plurality of vectors having a number of columns, wherein the number of columns is equal to a number of unique legs making up the financial products, wherein the three or more financial products form a plurality of implied orders;
   defining, by the processor, a first order as a first vector of the plurality of vectors;

identifying, by the processor, a list of candidate vectors from the plurality of vectors, each candidate vector having at least one nonzero column in common with the first vector;

selecting, by the processor, a second vector from the list of candidate vectors;

adding, by the processor, the first vector to the second vector to define a first intermediate vector;

removing, by the processor, the second vector from the list of candidate vectors;

outputting, by the processor to the electronic trading system, an implied order corresponding to the second vector, if the first intermediate vector has no nonzero columns;

not outputting, by the processor to the electronic trading system, the implied order corresponding to the second vector, if the first intermediate vector has nonzero columns; and executing, by the electronic trading system when an implied order has been output thereto, a tradable cycle corresponding to the first vector and the second vector; and whereby the electronic trading system processes less than all of the plurality of implied orders formed by the three or more financial products, the processed implied orders being more likely to trade than the implied orders that are not processed.

2. The method of claim 1, further comprising:
selecting, by the processor, a third vector from the list of candidate vectors and adding the third vector to the first intermediate vector to define a second intermediate vector, if the first intermediate vector has one or more nonzero columns; and
outputting, by the processor, another implied order corresponding to the second vector and third vector, if the second intermediate vector has no nonzero columns.

3. The method of claim 2, wherein the third vector and the second are not tradable.

4. The method of claim 1, wherein the second vector is selected because it has as many or more nonzero columns as each vector in the list of candidate vectors.

5. The method of claim 4, wherein selecting a second vector from the list of candidate vectors by the processor further comprises selecting the second vector based on expiry when there is more than one vector that has as many or more nonzero columns in common with the first vector as each vector in the list of candidate vectors.

6. The method of claim 1, further comprising:
selecting, by the processor, the list of financial instruments or strategies based on a user input.

7. The method of claim 1, further comprising:
restricting, by the processor, the list of candidate vectors based on a user input.

8. The method of claim 1, further comprising:
removing, by the processor if the second vector is a butterfly spread, all other butterfly spreads from the list of candidate vectors.

9. The method of claim 1, further comprising:
performing, by the processor, the selecting, adding, removing, and outputting for a subsequent vector and a subsequent candidate vector according to a predetermined maximum number of iterations.

10. The method of claim 9, further comprising:
specifying, by the processor, the predetermined maximum number of iterations according to a user input.

11. The method of claim 9, further comprising:
specifying, by the processor, the predetermined maximum number of iterations according to the type of financial instrument or strategy represented by the first vector.

12. The method of claim 1, wherein the implied order is a second generation implied order generated without defining any first generation implied orders.

13. An electronic trading system comprising a processor and a memory coupled therewith, the memory having stored therein computer executable logic executable by the processor to cause the processor to:
represent three or more financial products using a plurality of vectors having a number of columns, wherein the number of columns is equal to a number of unique legs making up the financial products, wherein the three or more financial products form a plurality of implied orders;
define a first order as a first vector of the plurality of vectors and identify a list of candidate vectors from the plurality of vectors, each candidate vector having at least one nonzero column in common with the first vector;
select a second vector from the list of candidate vectors that has one or more nonzero columns as each vector in the list of candidate vectors and add the first vector to the second vector to define a first intermediate vector, and to remove the second vector from the list of candidate vectors;
output, to the electronic trading system, an implied order corresponding to the second vector, if the first intermediate vector has no nonzero columns;
not output, to the electronic trading system, the implied order corresponding to the second vector, if the first intermediate vector has non-zero columns; and
execute, by the electronic trading system when an implied order has been output thereto, a tradable cycle corresponding to the first vector and the second vector; and
whereby the electronic trading system processes less than all of the plurality of implied orders formed by the three or more financial products, the processed implied orders being more likely to trade than the implied orders that are not processed.

14. The electronic trading system of claim 13, wherein the second vector is selected because it has as many or more nonzero columns as each vector in the list of candidate vectors.

15. The electronic trading system of claim 14, wherein selecting a second vector from the list of candidate vectors further comprises selecting the second vector based on expiry when there is more than one vector that has as many or more nonzero columns in common with the first vector as each vector in the list of candidate vectors.

16. The electronic trading system of claim 13, wherein the computer executable logic is further executable by the processor to cause the processor to select a third vector from the list of candidate vectors and adding the third vector to the first intermediate vector to define a second intermediate vector, if the first intermediate vector has one or more nonzero columns.

17. The electronic trading system of claim 14, wherein the computer executable logic is further executable by the processor to cause the processor to output another implied order corresponding to the second vector and third vector, if the second intermediate vector has no nonzero columns.

18. The electronic trading system of claim 13, wherein the third vector and the second vector are not tradable.

19. The electronic trading system of claim 13, wherein the computer executable logic is further executable by the processor to cause the processor to select the list of financial instruments or strategies based on a user input.

20. The electronic trading system of claim 13, wherein the list of candidate vectors is restricted based on a user input.

21. The electronic trading system of claim 13, wherein the computer executable logic is further executable by the processor to cause the processor to remove all butterfly spreads from the list of candidate vectors if the second vector is a butterfly spread.

22. A computer implemented method of optimizing the computation of implied orders to an electronic trading system, the method comprising:
- representing three or more financial products using a plurality of vectors having a number of columns, wherein the number of columns is equal to a number of unique legs making up the financial products, wherein the three or more financial products form a plurality of implied orders;
- defining a first order as a first vector of the plurality of vectors;
- reducing the plurality of vectors to a list of candidate vectors using one or more constraints, selecting a second vector from the list of candidate vectors that has one or more nonzero columns as each vector in the list of candidate vectors;
- adding the first vector to the second vector to define a first intermediate vector;
- removing the second vector from the list of candidate vectors;
- outputting, to the electronic trading system, an implied order corresponding to the second vector, if the first intermediate vector has no nonzero columns;
- not outputting, by the processor to the electronic trading system, the implied order corresponding to the second vector, if the first intermediate vector has nonzero columns; and
- executing, by the electronic trading system when an implied order has been output thereto, a tradable cycle corresponding to the first vector and the second vector; and
- whereby the electronic trading system processes less than all of the plurality of implied orders formed by the three or more financial products, the processed implied orders being more likely to trade than the implied orders that are not processed.

* * * * *